(12) United States Patent
Bossen et al.

(10) Patent No.: US 10,091,514 B1
(45) Date of Patent: Oct. 2, 2018

(54) APPARATUS AND METHOD FOR INTER AND INTRA MODE SELECTION AND BLOCK PARTITIONING

(71) Applicant: NGCodec Inc., Sunnyvale, CA (US)

(72) Inventors: Frank Bossen, Toronto (CA); Alberto Duenas, Mountain View, CA (US)

(73) Assignee: NGCodec Inc., Sunnyvale, CA (US)

( * ) Notice: Subject to any disclaimer, the term of this patent is extended or adjusted under 35 U.S.C. 154(b) by 0 days.

(21) Appl. No.: 15/240,805

(22) Filed: Aug. 18, 2016

Related U.S. Application Data

(63) Continuation of application No. 15/071,029, filed on Mar. 15, 2016, now Pat. No. 9,432,668.

(51) Int. Cl.
| | |
|---|---|
| *H04N 7/12* | (2006.01) |
| *H04N 11/02* | (2006.01) |
| *H04N 11/04* | (2006.01) |
| *H04N 19/159* | (2014.01) |
| *H04N 19/436* | (2014.01) |
| *H04N 19/513* | (2014.01) |

(52) U.S. Cl.
CPC ......... *H04N 19/159* (2014.11); *H04N 19/436* (2014.11); *H04N 19/513* (2014.11)

(58) Field of Classification Search
None
See application file for complete search history.

(56) References Cited

U.S. PATENT DOCUMENTS

| | | | | |
|---|---|---|---|---|
| 2010/0166075 A1* | 7/2010 | Lee | ...................... | H04N 19/176 375/240.16 |
| 2010/0278266 A1* | 11/2010 | Daian | .................. | H04N 19/176 375/240.15 |
| 2013/0070855 A1* | 3/2013 | Zheng | .................. | H04N 19/105 375/240.16 |
| 2014/0219342 A1* | 8/2014 | Yu | .......................... | H04N 19/50 375/240.12 |

* cited by examiner

*Primary Examiner* — Talha M Nawaz
(74) *Attorney, Agent, or Firm* — Cooley LLP

(57) ABSTRACT

A hardware video encoder includes an intra search block operating on a source picture to produce pairs of intra prediction mode indices and rate-distortion values for different block sizes. The pairs of intra prediction mode indices and rate-distortion values for the different block sizes are computed in parallel based upon the source picture. An inter search block produces pairs of motion vectors and rate-distortion values for different block sizes. The pairs of motion vectors and rate-distortion values for the different block sizes are computed in parallel.

7 Claims, 3 Drawing Sheets

APPARATUS AND METHOD FOR INTER AND INTRA MODE SELECTION AND BLOCK PARTITIONING

CROSS REFERENCE TO RELATED APPLICATIONS

This application is a continuation of U.S. patent application Ser. No. 15/071,029 filed on Mar. 15, 2016, the contents of which are incorporated herein by reference.

FIELD OF THE INVENTION

This invention relates generally to hardware based video signal processing. More particularly, this invention relates to inter and intra mode selection and block partitioning of video signals.

BACKGROUND OF THE INVENTION

High Efficiency Video Coding (HEVC) is a video compression standard. In HEVC the basic processing unit is called a coding tree unit (CTU). It can be as large as 64×64 luma samples. A CTU can be split into multiple coding units (CU) in a quad-tree fashion. The CU is the basic unit for forming a motion compensation prediction. The CU can be coded as either an intra-picture prediction (intra) or an inter-picture predication (inter). In the intra case, one or more prediction angles are coded along with each CU. In the inter case, one or more motion vectors are coded along with each CU.

The majority of the coding efficiency gains of HEVC can be attributed to a flexible block partitioning structure. Therefore, selecting block sizes is very important for good coding efficiency. Extensively checking every possible block size requires a very significant amount of computations. Therefore, such an approach is not plausible for encoders with limited computational requirements, such as real-time encoders. Therefore, it is desirable to develop a block partitioning method with low complexity and high coding efficiency.

Some of the coding efficiency in HEVC comes from the use of data correlations. This introduces serial dependencies and is ill suited for massive parallel processing. Accordingly, it would be desirable to develop a method that is suited for massive parallel processing where only limited sections of the overall encoding algorithm need to be processed serially.

Efficient encoders rely on rate-distortion metrics to make decisions such as block size determination. Given a number of choices for a block size, an encoder estimates rate and distortion for each choice. The rate is generally expressed as a number of bits needed to encode the choice. The distortion can be expressed as a sum of squared differences between a block to be coded and its reconstructed version after compression. While it is possible to compute exact numbers when estimating rate and distortion, such an approach is impractical in most scenarios, in particular for real-time encoders. This impracticality stems from the high computational complexity required to compute the estimates. In practice, computationally efficient approximations are used. A rate estimate R and a distortion estimate D are typically combined into a single rate-distortion cost estimate C using a linear combination such as $\lambda R+D$ where $\lambda$ is a weighting factor called a Lagrange multiplier. This weighting factor reflects the desired balance between rate and distortion and may be adjusted according to a target bit rate. Once costs are determined for each of the choices available to the encoder, the one with the lowest cost is picked. This process is commonly referred to as rate-distortion optimization (RDO). There is a need for improved approaches to RDO.

SUMMARY OF THE INVENTION

A hardware video encoder includes an intra search block operating on a source picture to produce pairs of intra prediction mode indices and rate-distortion values for different block sizes. The pairs of intra prediction mode indices and rate-distortion values for the different block sizes are computed in parallel based upon the source picture. An inter search block produces pairs of motion vectors and rate-distortion values for different block sizes. The pairs of motion vectors and rate-distortion values for the different block sizes are computed in parallel.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The invention is a hardware based encoder that efficiently performs CU size and mode selection. Efficiency is achieved by limiting the amount of computations along serial prediction paths. Serial prediction paths in HEVC include: (1) sample predictions when using intra prediction modes; (2) most probable mode (MPM) computations used to efficiently encode intra prediction mode indexes; and (3) motion vector prediction (MVP) and merge list computations used to efficiently encode motion vector information.

Figure 1:
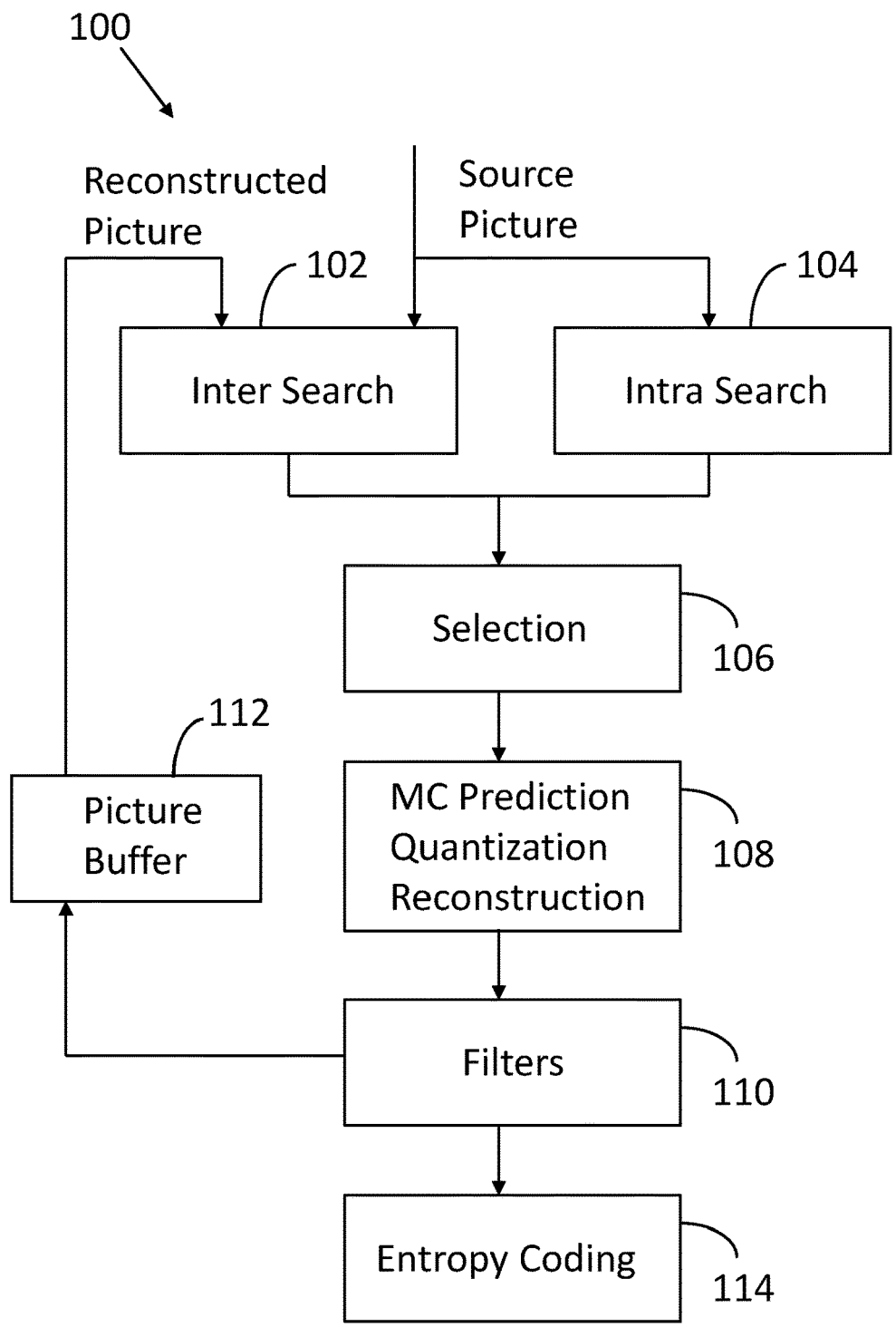
FIG. 1 illustrates an encoder configured in accordance with an embodiment of the invention.

FIG. 1 illustrates an encoder 100 configured in accordance with an embodiment of the invention. An inter search module 102 receives a reconstructed picture and a source picture. An intra search module 104 receives the source picture. Typically, intra search is performed in connection with a reconstructed picture. The current invention performs intra searching in connection with a source picture. This allows for parallel processing. Various techniques are used in connection with the source picture to approximate results that would be obtained if the standard approach of processing a reconstructed picture was used.

Blocks 102 and 104 can be considered a first stage of processing. These modules generate the following for multiple block sizes and locations (1) prediction mode information and (2) Rate-Distortion (RD) costs for residuals. Alternatively, rate and distortion estimates may be provided separately for subsequent combination. These modules use heavy signal processing and parallelism. They do not use accurate motion vector predictions and most probable mode (MPM) computations. By applying less precision to the motion vector predictions, it is possible to test multiple blocks in parallel by breaking serial dependencies. Removing MPM computations eliminates a serial prediction path and therefore allows for parallel processing.

A selection module 106 may be considered a second stage of processing. The selection module 106 uses information from the first stage to select block size, intra/inter mode, intra prediction mode and motion vector. These modules perform accurate motion vector prediction and MPM computation to make selections. Thus, the motion vector prediction computation omitted in the first stage to facilitate parallelism is re-introduced at this stage. Similarly, the MPM computation omitted in the first stage is utilized at this stage.

The subsequent modules may be considered a third stage. These modules include a motion compensation prediction/quantization/reconstruction block 108, filters 110, a picture buffer 112 and an entropy encoder 114. These blocks compute reconstructed samples and generate a bit stream based on decisions of the selection module 106. This is where accurate sample prediction for intra modes takes place.

The blocks of FIG. 1 are implemented in hardware, such as an application specific integrated circuit, a field programmable logic device or combinations thereof. Hardware based implementations are required to obtain adequate processing speed.

The main purpose of the inter search module 102 and the intra search module 104 is to determine a list of pairs of {prediction mode information, rate-distortion cost}. The prediction mode information can be either an intra prediction mode used for intra prediction or a motion vector used for inter prediction. The rate-distortion (RD) cost represents the estimated cost of coding the residual, i.e. the difference between the samples to be coded and the predicted samples.

While the HEVC standard specifies use of reconstructed samples for intra prediction, original samples are used instead to enable parallelism. While there are 35 intra prediction modes defined in HEVC, only a subset are tested. One example of a subset comprises the DC and planar modes, as well as 1 out of 4 angular modes (e.g., modes 2, 6, 10, 14, 18, 22, 26, 30 and 34).

The RD cost for intra needs to be adjusted since the prediction relies on original samples instead of reconstructed samples. Original samples can be modeled as the reconstructed samples minus a reconstruction error. The reconstruction error is generally defined as reconstructed samples minus original samples. Thus, original samples are equal to reconstructed samples minus a reconstruction error. The reconstruction error is computed downstream in block 108. An average reconstruction error or a recent reconstruction error may be used for the current source picture.

The RD cost may be computed as follows. A residual is formed by subtracting a predicted block of samples from an original block of samples. The predicted block of samples is obtained by using spatial prediction. A transform is applied to the residual followed by quantization. Thus, the intra search block 104 performs operations, such as those performed in block 108.

The distortion that results from the quantization is computed in the transformed domain. It can be expected to be about the same as in the baseband (sample) domain because the transform is close to orthonormal. Computing in the transformed domain avoids the need for applying an inverse transform. For rate estimation the absolute values of the amplitude of quantized coefficients are considered. For example a logarithmic function may be used to determine an amount of bits such as $4+2*floor(\log_2(x))$ and 0 if x is 0, where x is the amplitude of a coefficient.

The RD cost adjustment tries to model the reconstruction error. This reconstruction error cannot be precisely known. It can be approximated by using a simple linear model for adjusting the RD cost: multiply it by a scale factor and add a constant. This adjustment is most necessary in the context of comparing these RD costs with RD costs for using inter prediction which can be computed without relying on original samples.

Motion estimation is also conducted in the first stage in block 102. For each block a motion vector is determined so as to provide a good temporal prediction using a previously encoded picture. Motion estimation typically consists of multiple stages. For example it may start with a search that covers a large area, but using a rough approximation of prediction quality, for example by operating in a subsampled domain. An initial motion vector estimate may then be refined in later stages by a combination of integer pixel refinements and subpixel refinements.

An RD cost is computed for the motion vector that is found. This cost is computed by a combination of motion compensation, transform and quantization. The distortion estimate and the rate estimate are computed the same way as the one used in the intra prediction case (except for the adjustment).

As precise motion vector prediction is not possible in this stage, it is preferable to consider multiple motion vectors for each block such as to maximize chances that a motion vector matches an actual motion vector predictor. Therefore RD cost is computed for additional motion vectors, including the zero vector (representing no motion), and the vectors found in neighboring blocks (for example a block to the left and a block above). When the temporal MVP feature is enabled in HEVC, the corresponding motion vector is tested as well.

Figure 2:
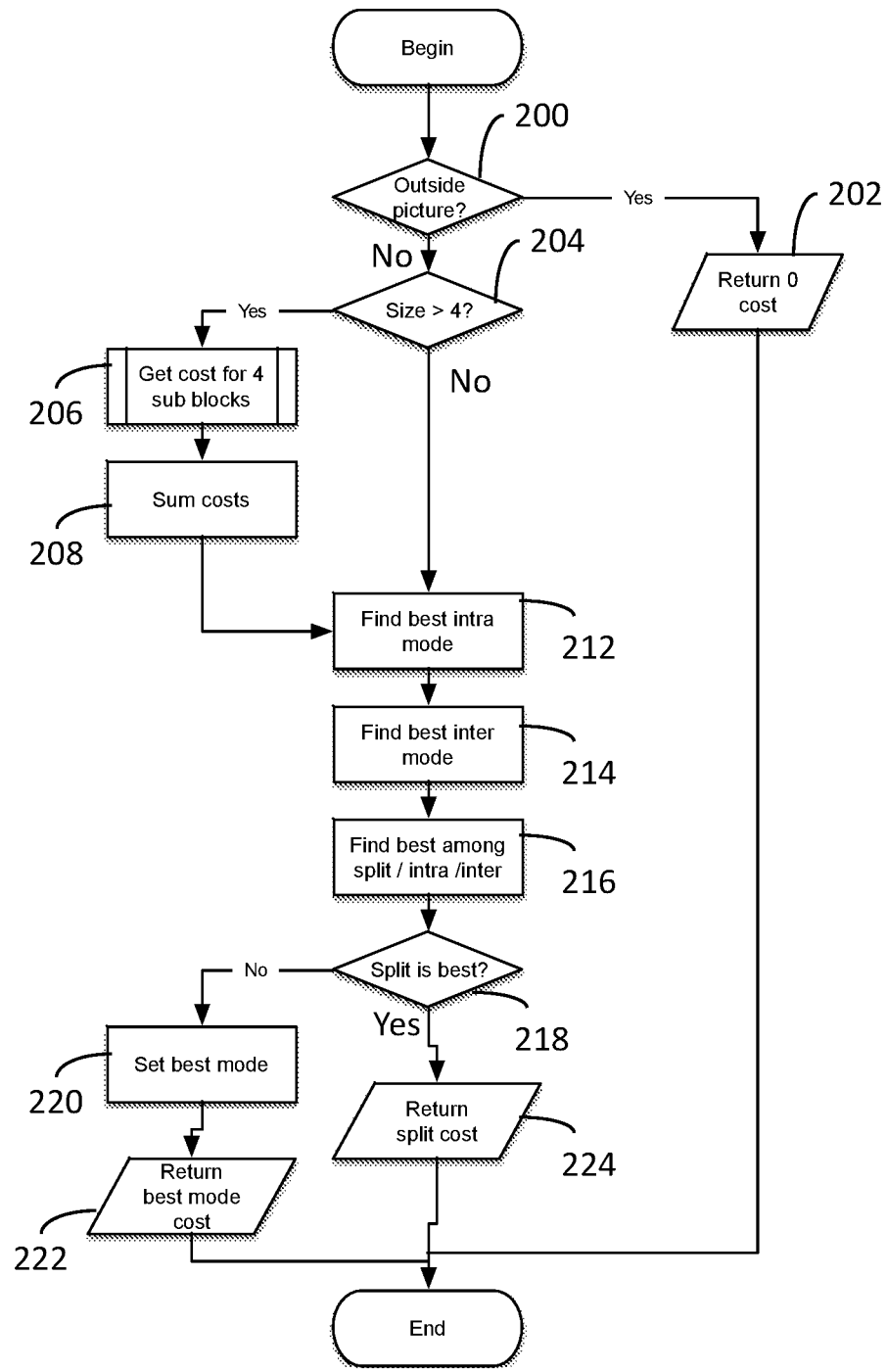
FIG. 2 illustrates recursive selection processing performed in accordance with an embodiment of the invention.

The selection module 106 linearly scans through blocks of various sizes within a CTU. Although it is typically implemented in a non-recursive fashion, the process is easier understood using a recursive function as follows. The function is initially called for a single block covering the entire CTU. The function comprises the operations shown in FIG. 2. Initially, it is determined whether a current block lies outside picture boundaries 200. If so (200—Yes) a cost value of 0 is returned 202. The cost is 0 because blocks lying outside picture boundaries are not coded and therefore do not have a coding cost.

If the current block does not lie outside the picture boundaries (200—No) a threshold size is tested 204. For example, if the current block size is larger than a threshold of 4, recursively call the function 4 times 206. That is, the cost for 4 sub blocks is computed. The costs associated with each of these smaller blocks are summed 208. This represents the cost for "splitting". That is, splitting a block size has associated costs that are quantified in this operation.

The best intra mode is then found 212. That is, for each pair of intra prediction mode and cost associated with the current block, determine the total cost by adding the cost of coding the mode to the previously available cost. The cost of coding the mode depends on the MPM values which are computed. The intra prediction mode with the lowest total cost is retained and its total cost represents the cost for "intra".

Next, the best inter mode is found 214. That is, for each pair of motion vector and cost associated with the current block, determine the total cost by adding the cost of coding the motion vector to the previously available cost. The cost of coding the motion vector depends on the MVP and merge list values which are computed here. At this step it is determined whether a given motion vector can be encoded using the merge mode by comparing the motion vector that is identical to any vector in the merge list. The motion vector with the lowest total cost is retained and its total cost represents the cost for "inter".

Next, the best option among split, intra and inter is found 216. That is, the costs for "splitting", "intra" and "inter" are compared and the lowest value is determined. In other words, different block sizes with different intra and inter values are evaluated at this stage. The mode and block size with the lowest cost is selected.

If any of cost was not assigned a value in the previous steps, its value is assumed to be infinite. If "splitting" is the lowest cost of previously assigned CU sizes (218—Yes), prediction modes and vectors are maintained for the current block and the split cost is returned 224. If the lowest cost is "intra" or "inter" (218—No) then the current block is assigned its CU size and the relevant prediction mode (i.e., "intra" if the "intra" cost was lower, and "inter" otherwise) is set 220. It is further assigned the intra prediction mode or motion vector as appropriate. The best mode cost is then returned 222. The function returns with the lowest cost of the 3 costs that were compared (the costs returned from 202, 222 and 224).

Figure 3:
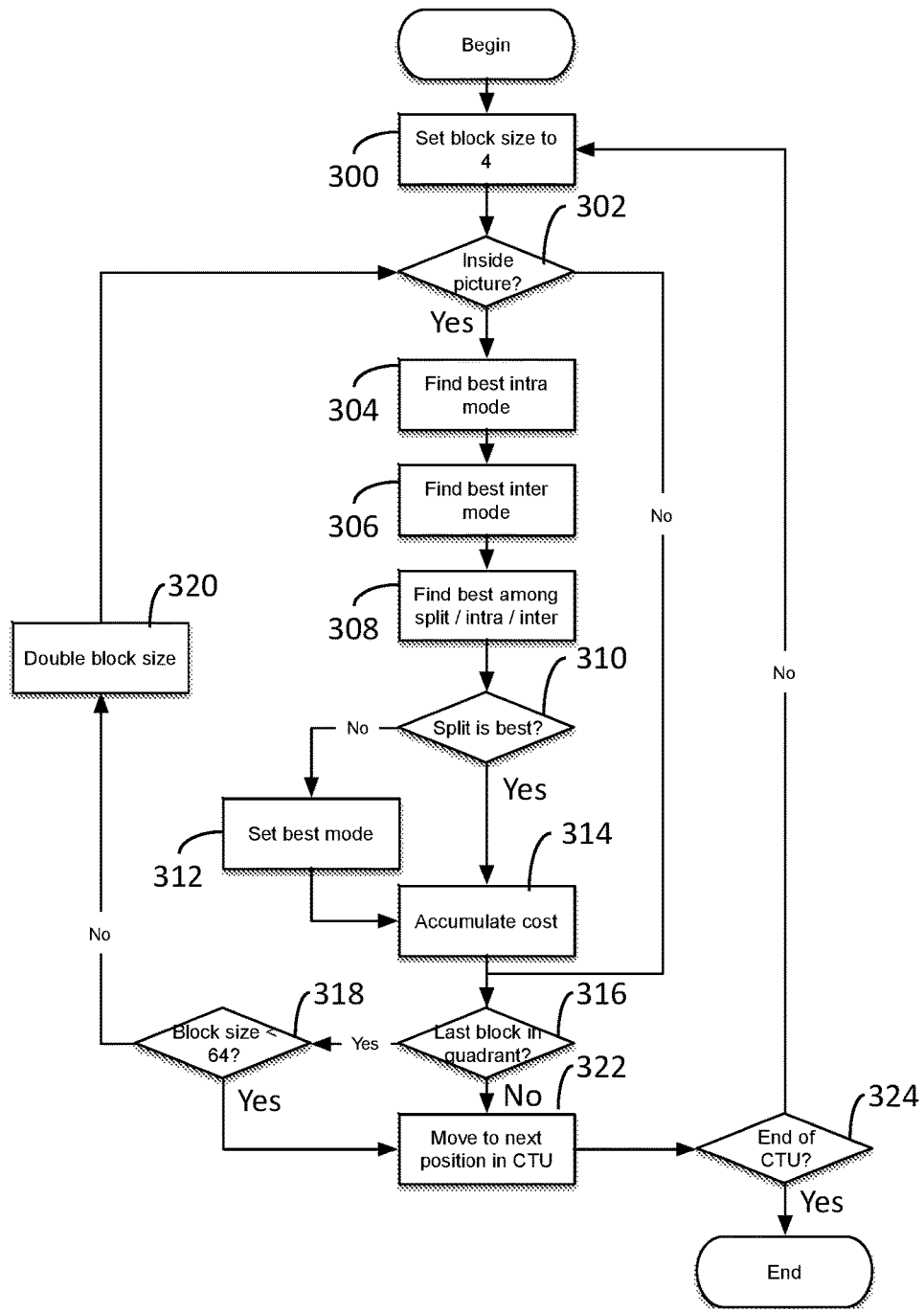
FIG. 3 illustrates non-recursive selection processing performed in accordance with an embodiment of the invention.

Alternatively the same process can be implemented in a non-recursive fashion, as shown in FIG. 3. Initially, the block size is set to four 300. If the current block lies outside picture boundaries (302—No), proceed to the "last quadrant" test of block 316.

If the current block is inside picture boundaries (302—Yes), the best intra mode is found 304. That is, for each pair of intra prediction mode and cost associated with the current block, determine the total cost by adding the cost of coding the mode to the previously available cost. The cost of coding the mode depends on the MPM values which are computed. The intra prediction mode with the lowest total cost is retained and its total cost represents the cost for "intra".

Next, the best inter mode is found 306. For each pair of motion vector and cost associated with the current block, determine the total cost by adding the cost of coding the motion vector to the previously available cost. The cost of coding the motion vector depends on the MVP and merge list values which are computed here. At this step it is determined whether a given motion vector can be encoded using the merge mode by comparing the motion vector that is identical to any vector in the merge list. The motion vector with the lowest total cost is retained and its total cost represents the cost for "inter".

Next, the best among split, intra and inter is found 308. That is, the costs for "splitting", "intra" and "inter" are compared and the lowest value is determined. The cost of "splitting" is given by the accumulated cost for half the current block size, if available. The cost should be available unless half of the current block size is smaller than the smallest allowed block size, which is four in the present example. If any of these costs was not assigned a value in the previous steps, its value is assumed to be infinite. If "splitting" is the lowest cost previously assigned CU sizes (310—Yes), prediction modes and vectors are maintained for the current block and the cost is accumulated 314. If the lowest cost is "intra" or "inter" (310—No) then the current block is assigned its CU size and the relevant prediction mode (i.e., "intra" if the "intra" cost was lower, and "inter" otherwise) is set 312. It is further assigned the intra prediction mode or motion vector as appropriate. The current cost is added to an accumulator for the current block size 314.

In step 314 cost accumulations are performed as follows. If the current block is the first block in its quadrant, then the accumulated cost for the current block size is set equal to the lowest cost determined in step 308. Otherwise, if the current block is not the first block in its quadrant, the lowest cost determined in step 308 is added to the accumulated cost for the current block size. The first block in the quadrant test can be computed as follows. Given the position x and y of the current block of size S in a CTU, the block is the first one in its quadrant if (x & S) is equal to 0 and (y & S) is equal to 0, where & is the logical AND operator.

It is then determined whether the current block is the last block in the quadrant. If not (316—No), move to the next position in the CTU 322. If so (316—Yes), it is determined if the block size is at 64. If so (318—Yes), processing proceeds to block 322. If not (318—No), the block size is doubled 320. If the end of the CTU is reached (324—Yes) then the process stops; otherwise (324—No) the flow returns to block 300.

The last block in the quadrant test can be computed as follows. Given the position x and y of the current block of size S in a CTU, the block is the last one in its quadrant if (x & S) is equal to S and (y & S) is equal to S, where & is the logical AND operator.

One key process in the third stage (blocks 108-114) is the determination of quantized transform coefficients. Such coefficients are determined for each block or transform unit (TU) as follows. A predicted block is generated, either using an intra prediction process or using a motion compensation process. The difference between the original block and the predicted block is transformed using an approximation of a Discrete Cosine Transform (DCT) or of a Discrete Sine Transform (DST). The resulting transform coefficients are then quantized. A reconstructed block is generated by applying inverse quantization and inverse transformation to the quantized coefficients and combining it with the prediction. This reconstructed block may be used to predict subsequent blocks. This last step mirrors the operation of a decoder.

Once it is known whether any coefficient in a given block or coding unit (CU) is nonzero it becomes possible to determine whether the skip coding mode can be used. The skip mode is signaled for a given CU whenever it was determined in the selection module that the merge mode is applicable for the CU and no nonzero quantized coefficient is present.

Another key process of the third stage is entropy coding. Entropy coding converts decisions and data previously generated into bits that are transmitted to a decoder. In HEVC entropy coding is based on arithmetic coding.

Reconstruction of the picture may further include application of de-blocking and Sample Adaptive Offset (SAO) filters. These steps are optional since these features are not present in every compression format and may be disabled by an application. Furthermore, when encoding all pictures as I pictures there is no need to apply these filters in an encoder since the fully reconstructed picture is never used for later prediction (note that the intra prediction process typically relies on samples before such filtering).

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A hardware video encoder, comprising:
   an intra search block operating on a source picture to produce intra search block output including pairs of intra prediction mode indices and rate-distortion values for different block sizes, wherein the pairs of intra prediction mode indices and rate-distortion values for the different block sizes are computed in parallel based upon the source picture, wherein the intra search block omits most probable mode computations to achieve parallelism;
   an inter search block to process the intra search block output to produce inter search block output including pairs of motion vectors and rate-distortion values for different block sizes, wherein the pairs of motion vectors and rate-distortion values for the different block sizes are computed in parallel, wherein the inter search block omits motion vector prediction and merge list computations to achieve parallelism;
   a selection block to process the inter search block output to produce selection block output, the selection block performing most probable mode computations, motion vector prediction and merge list computations;
   a motion compensation prediction, quantization and reconstruction block to process the selection block output to produce motion compensation output; and
   an entropy encoder to process the motion compensation output to produce encoder output for transmittal to a decoder.

2. The hardware video encoder of claim 1 wherein the intra search block omits processing of a reconstructed image to achieve parallelism.

3. The hardware video encoder of claim 1 wherein the intra search block only tests a subset of intra prediction modes.

4. The hardware video encoder of claim 1 wherein the intra search block computes distortion values in a transformed domain.

5. The hardware video encoder of claim 1 wherein the inter search block computes distortion values in a transformed domain.

6. The hardware video encoder of claim 1 further comprising a selection block for linearly scanning through coding units of different sizes, wherein each coding unit has pairs of intra prediction mode indices and rate-distortion values and pairs of motion vectors and rate-distortion values.

7. The hardware video encoder of claim 1 configured to use a skip coding mode when it is determined that a merge mode is applicable in a coding unit and no quantized coefficient in the coding unit is non-zero.

* * * * *